March 1, 1955     K. E. FISH     2,703,020
TENTER CHAIN
Filed March 12, 1954
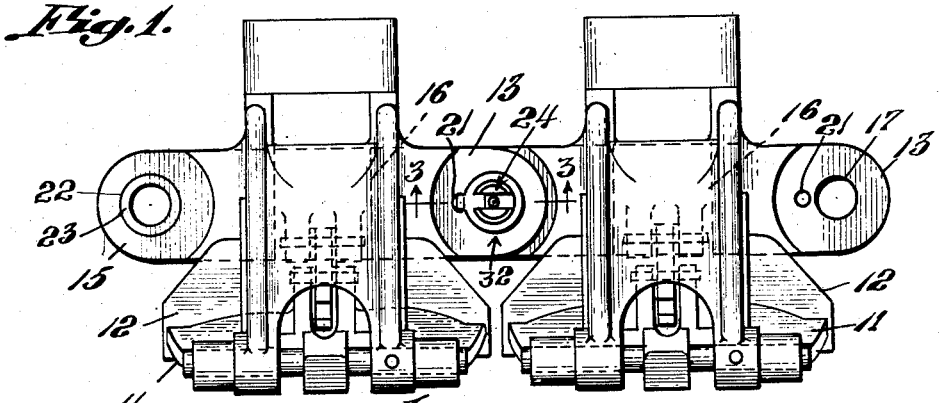
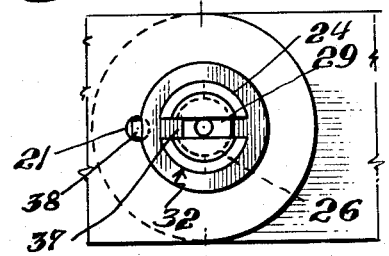
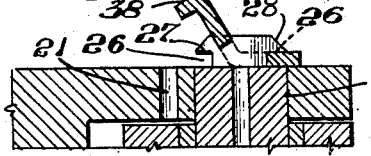
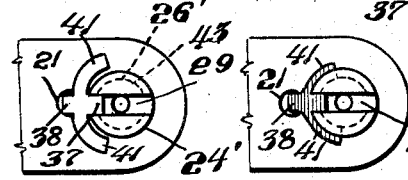
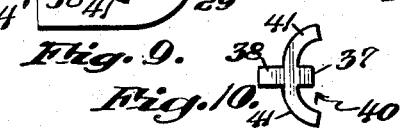
INVENTOR.
Kenneth E. Fish
BY
Barlow & Barlow
ATTORNEYS.

United States Patent Office 2,703,020
Patented Mar. 1, 1955

2,703,020

TENTER CHAIN

Kenneth E. Fish, Norwood, R. I., assignor to Winsor & Jerauld Manufacturing Company, a corporation of Maine Application March 12, 1954, Serial No. 415,876

6 Claims. (Cl. 74—254)

This invention relates to improvements in tenter chains, particularly the hinge connection between the links of the chain.

A tenter chain is composed of a plurality of similar link units pivotally related to each other to form an endless chain which passes over a driven sprocket gear at one end of the tenter machine and over an idler sprocket at the other end of the machine. It is customary to connect two units by means of a hardened steel rivet or pivot pin which is fastened against rotation relative to one of the links as by means of upsetting an end edge portion of the rivet to engage a recess formed at the edge of the opening in the hinge lug. Thus, the rivet is locked or keyed to the link against rotation. When it is required to disconnect links for repair and other purposes, the heads of the rivets are broken off and the rivet is thus damaged in the process of removing the same. It frequently happens that a link unit is also damaged beyond further use in that a hinge lug or lugs are fractured or broken in the removal of a rivet.

An object of the invention is to improve the manner of fastening the pivot pin against rotation.

Another object is to provide a pivot pin fastening which may be readily detached for removal of the pivot pin without destroying the same.

Another object is to provide a pivot pin fastening which may be readily positioned in place and locked to the link by a simple bending operation.

A more specific object is to provide a pivot pin fastening of a simple clip-like formation to be keyed to the pivot pin and to the link by a manual bending operation thereon as by means of a hammer blow.

Another object is to provide a fastening of the above character which may be economical of manufacture and satisfactory in use.

With these and other objects in view, the invention consists of certain novel features of construction as will be more fully described and particularly pointed out in the appended claims.

In the accompanying drawing:

Figure 1 is a top plan view of two link units of a tenter chain pivotally related in a manner embodying my invention;

Figure 2 is a top plan view on a larger scale of a fragmentary portion of the pivot or hinged connection between the links shown in Figure 1;

Figure 3 is a sectional view taken substantially along line 3—3 of Figure 1 and shown on a larger scale;

Figure 4 is a sectional view taken substantially along line 4—4 of Figure 2;

Figure 5 is a sectional view illustrating the pivot pin fastening in position about the pivot pin and prior to being bent into locking position with the link;

Figure 6 is a plan view of the pivot pin fastening in the blank form;

Figure 7 is a perspective view of the fastening of Figure 6 bent into the form for application to the pin;

Figures 8 and 9 are two similar top plan views of a modified pivot pin fastening, Figure 8 illustrating the fastening in position to be bent into engagement with the pivot pin as illustrated in Figure 9;

Figure 10 is a plan view of the fastening shown in Figures 8 and 9; and

Figure 11 is a sectional view illustrating a modified pivot pin and the manner of applying the fastening means of Figure 7 thereto.

Referring to Figure 1, 10 designates generally a pair of units or links of a tenter chain. These are of well-known construction familiar to workers in this art and need not be described in detail for a clear understanding of the invention other than to point out that each unit is alike and is provided with the usual cloth engaging jaws 11, 12 between which the cloth is gripped in traversing the same through the tenter machine. Each link has the usual bifurcated hinge lugs 13 and 14 (see Figure 3) at one side thereof and the single hinge lug 15 on the opposite side. A generally rectangular recess 16 is formed at the inner side portion of the link for receiving a tooth of the drive sprocket gear wheel (not shown) which drives the chain.

The lugs 13 and 14 have aligned bores 17 and 18, respectively (see Figure 3) and the end of bore 18 is enlarged as at 19 providing a recess that forms a retaining annular shoulder 20. An opening 21 is provided through the lug 13 at a position adjacent to the edge of bore 17 and preferably in line with a plane passing centrally through the lugs 13 and 15 and toward the lug 15. The lug 15 has a bore 22 in which is inserted a bush bearing 23 made of a hardened steel material. The lug 15 is at a position in line with the lugs 13 and 14 and is received between the lugs 13 and 14 of an adjacent link with the bearing opening of the bush 23 in register with the aligned bores 17, 18. A pivot pin designated generally 24 is received in the aligned openings and pivotally connects the links into an endless chain of a length depending upon the length of tenter machine.

Each link is relatively heavy, there being a plurality of links in each chain. The weight causes a considerable drag on the chain, and there is a tendency for considerable wear between the bearing contacting surfaces at the hinge pivot in the direction of the pull or travel of the chain. In order to prevent wear of the bores 17 and 18, it usual as previously stated to upset an edge of the pivot pin 24 and secure it against rotation. In accordance with the present invention, the pin 24 has an annular flange 25 formed at one end thereof which nests into the recess 19 and against the shoulder 20 so as to limit upwardly axial movement of the pin 24. The pin 24 is made of a length to project beyond the upper side of the lug 13 and this extending portion is recessed as at 26 to form an annular shoulder 27 (Figure 5). The lower wall of the recess 26 is at a distance from the flange 25 slightly less than the distance between the shoulder 20 and the upper side of the lug 13. Thus, when the pin is in position, the lower wall of recess 26 is slightly below the surface of the upper side of the lug 13. The upper edge of the portion of the pin 24 outwardly of the recess 26 is chamfered or tapered as at 28 and has formed therein a slot 29 which extends diametrically across the pin and inwardly to substantially the inner wall of the recess 26. An oil bore 30 is formed to extend inwardly from the upper end of the pin and axially thereof. The bore 30 is intersected by a cross bore 31 of a similar diameter which extends radially preferably in line with the slot 29 and opens into the side of the pin at a location inwardly of the bushing 23 adjacent to the upper edge thereof. In inserting the pin 24 in position, the slot 29 is aligned with the opening 21 and serves as a datum point to locate the oil bore 31 at the location of the point at which there is the tendency of most wear between bearing surfaces. A pivot pin fastening or clip 32 engages the pin 24 and opening 21 to fasten the pin 24 in place.

In a preferred embodiment of the invention the clip 32 is made of a mild steel material in the blank form of a washer-like element 33 (see Figure 6) having an outside diameter larger than the pivot pin 24 and of a thickness slightly less than the width of the recess 26. The bore 34 through the clip is made of two diameters, the wall portion 35 of the smaller portion of the bore 34 extending on the radius of the neck portion of the pin 24 formed by the recess 26. The other wall portion 36 of the bore 34 is made on a radius slightly larger than one half of the diameter of the pin 24. A tab 37 is formed on the wall 36 and extends radially inwardly of the wall portion 36, while a similar tab 38 is formed on the outer periphery of the clip and extends outwardly opposite the tab 37. These two tabs are positioned to be at right angles to the diametrical wall portions 39 which join the wall portions 35 and 36 of the bore 34. The blank thus formed is bent diametrically across at the wall portions 19 as best seen in Figure 7, and the tab 38 is bent at substantially right angles as seen in this Figure 7.

Referring now to Figure 5, the clip may be readily inserted in the recess 26 by first positioning the tab 37 in line with the slot 29 and sliding the wall portion 35 into the recess 26 to engage the neck formed by the recess 26. It may be here pointed out that the tabs 37, 38 are made of a width slightly less than the diameter of the opening 21 and the width of slot 29. The clip will now engage the shoulder 27 and adjacent surface of lug 13 and draw flange 25 against shoulder 20 so as to lock the pin 24 against axial movement. The other half of the clip 32 may now be bent as by means of a hammer blow to pass the same over the end of the pin 24 so as to return the clip to a flat condition (as in Figure 6) with the tab 37 engaged with the walls of the slot 29 and the tab 38 engaged in the opening 21. The taper 28 provides ample clearance for the wall portion 36 to pass thereby. The opening 21 may be so spaced from the edge of bore 17 that upon being initially engaged by the tab 38, the wall 36 will be moved slightly beneath the shoulder 27, thus providing for additional engagement with the shoulder 27.

In Figures 8, 9, and 10 I have shown a modified lock clip which is adapted to be locked in position by a squeezing action on the arms of the clip. Referring particularly to Figure 10, the clip 40 has the tabs 37, 38 and curved arms 41 each similar to the other. The inner side of each of the arms 41 is made on the radius of the undercut neck portion 43 of the pivot pin 24' which is similar to the pivot pin 24 with the exception that a chamfer 28 need not be provided. The tab 38 is similarly bent at right angles to the arms 41. With the slot 29 in alignment with the opening 21, the clip 40 may be placed in position with the tab 37 engaged with the slot 29, as seen in Figure 8, and the tab 38 engaged in the opening 21. In this position of the clip 40, the arms 41 will be in line with the recess 26' and may be bent inwardly towards each other to engage in the recess 26' and thus lock the pivot pin against axial movement and rotation in the bores 17, 18.

In Figure 11 I have illustrated a modified pivot pin which is substantially similar to the pivot pin illustrated in Figure 3 with the exception that the tab receiving slot 29' is made at one edge of the pin with the bottom thereof at substantially a 45 degree angle to the vertical. The fastening clip 32 is positioned so that the wall portion 35 engages the shoulder 27 and is then bent so that tab 37 engages the angular slot 29' and tab 38 enters the opening 21. This is in all ways similar to the embodiment of Figures 1–7 except for the slot 29' of the pivot pin that angularly relates the tab 37, allowing the tab to be made shorter than in the previous showings.

When it becomes necessary to detach links from each other, the lock clips may be disengaged by a prying action to withdraw the tab 38 from opening 21 and thereafter the clip removed from the pivot pin to free the same to be removed from the links, this without any mutilation of the said pivot pin which may be again placed in use after repair or other operation may be performed on the freed link.

I claim:

1. A tenter chain having a plurality of link units, a pivot pin for pivotally connecting adjacent links together and having an annular shoulder and a slot therein, a fastening clip positioned between said shoulder and link and having a projection thereon entering said slot to prevent relative rotation between the clip and pivot pin, said clip having a second projection engaged with an adjacent portion of one of said links to prevent relative rotation between said one of said links and said clip.

2. A tenter chain having a plurality of link units, a pivot pin for pivotally connecting adjacent links together and having an annular shoulder and a cross wise slot at one end thereof, a fastening clip positioned between said shoulder and link and having a tab projecting therefrom entering said slot to prevent relative rotation between the clip and the pivot pin, one of said links connected by said pin having an opening adjacent said shoulder, said clip having a second tab entering said opening to prevent relative rotation between the said one of said links and said clip.

3. In a hinge joint, a pivot pin having an annular recess, a slot in the end of said pin, a fastening for said pivot pin comprising a clip adapted to be positioned in said recess and against the adjacent side of the hinge joint, said clip having a first tab entering said slot to prevent relative rotation between the pivot pin and the clip, said adjacent side having an opening therein and said clip having a second tab entering said opening to prevent relative rotation between the said adjacent side and said clip.

4. A hinge joint as in claim 3 wherein said slot extends on a diameter of said pin.

5. A hinge joint as in claim 3 wherein said slot extends on a partial radius of said pin.

6. A hinge joint as in claim 3 wherein said clip comprises a circular piece of flat stock having two internal radii, the first radii being approximately equal to the radius of said annular recess, the second radii being equal to the radius of said pin.

References Cited in the file of this patent

UNITED STATES PATENTS

| 2,082,315 | Williams | June 1, 1937 |
| 2,365,228 | Vanderzee | Dec. 19, 1944 |
| 2,453,898 | Forbes | Nov. 16, 1948 |